United States Patent
Cortes Ramirez et al.

(10) Patent No.: US 8,250,741 B2
(45) Date of Patent: Aug. 28, 2012

(54) MECHATRONIC SYSTEM AND METHOD FOR POSITIONING BOLTS IN ORDER TO PROVIDE A FRAME WITH A RECONFIGURABLE SURFACE USING MEMORY EFFECT ACTUATORS

(75) Inventors: Jorge Armando Cortes Ramirez, Nuevo León (MX); Rogelio de la Garza Giacoman, Nuevo León (MX); Ruth Oseki Valdes Nakamura, Nuevo León (MX); Rodrigo Berlanga Zamarron, Nuevo León (MX)

(73) Assignee: Instituto Tecnologico y de Estudios Superiores de Monterrey, Monterrey (MX)

( * ) Notice: Subject to any disclaimer, the term of this patent is extended or adjusted under 35 U.S.C. 154(b) by 836 days.

(21) Appl. No.: 12/158,336

(22) PCT Filed: Dec. 15, 2006

(86) PCT No.: PCT/MX2006/000143
§ 371 (c)(1),
(2), (4) Date: Oct. 20, 2008

(87) PCT Pub. No.: WO2007/073140
PCT Pub. Date: Jun. 28, 2007

(65) Prior Publication Data
US 2009/0306799 A1 Dec. 10, 2009

(30) Foreign Application Priority Data
Dec. 21, 2005 (MX) ............... NL/a/2005/000104

(51) Int. Cl.
*B23P 19/00* (2006.01)
(52) U.S. Cl. ........................................ 29/739
(58) Field of Classification Search ............... 29/739
See application file for complete search history.

(56) References Cited

U.S. PATENT DOCUMENTS
1,465,152 A   8/1923   Williams et al.
(Continued)

FOREIGN PATENT DOCUMENTS
JP          60133924          7/1985
(Continued)

OTHER PUBLICATIONS

Nakatani et al., Control Method for a 3D form Display with Coil-type Shape Memory Alloy, Apr. 2005, Proceedings of the 2005 IEEE International Conference on Robotics and Automation, pp. 1332-1337.*

(Continued)

*Primary Examiner* — A. Dexter Tugbang
*Assistant Examiner* — Jeffrey T Carley
(74) *Attorney, Agent, or Firm* — Roylance, Abrams, Berdo & Goodman, L.L.P.

(57) ABSTRACT

A reconfigurable computer-controlled system is provided based on the positioning of bolts. A greater density of bolts per unit area increases the variety of figures or shapes that can be defined by a frame or tool used in the industry, such that it is no longer necessary to construct rigid surfaces with each change made to the shape of the product to be produced or surface to be formed. The use of the memory effect material as an actuator in the reconfigurability mechanism is the key to the success of the reconfigurable system and the control system owing to the permissibility of small bolts which can be adapted to standard sizes and shapes. The mechatronic system uses the positioning of bolts for the reconfigurability of surfaces to manufacture and shape materials.

20 Claims, 6 Drawing Sheets

U.S. PATENT DOCUMENTS

| | | | |
|---|---|---|---|
| 1,826,783 A | 10/1931 | Hess | |
| 2,334,520 A | 11/1943 | Walters | |
| 4,212,188 A | 7/1980 | Pinson | |
| 4,806,815 A | 2/1989 | Honma | |
| 5,685,721 A * | 11/1997 | Decker | 434/114 |
| 6,326,707 B1 | 12/2001 | Gummin et al. | |
| 6,705,868 B1 * | 3/2004 | Schleppenbach et al. | 434/114 |
| 2002/0158836 A1 * | 10/2002 | Ishmael et al. | 345/156 |
| 2005/0069842 A1 * | 3/2005 | Schleppenbach et al. | 434/113 |

FOREIGN PATENT DOCUMENTS

| | | | |
|---|---|---|---|
| WO | WO 98/41962 | * | 9/1998 |

OTHER PUBLICATIONS

Howe et al., Shape Memory Alloy Actuator Controller Design for Tactile Displays, Dec. 1995, 34th IEEE Conference on Decision and Control.*

Nakatani et al., 3D Form Display with Shape Memory Alloy, Dec. 3-5 2003, Japan, ICAT 2003.*

Song G et al., Active position control of a shape memory alloy wire actuated composite beam. Smart Materials and Structures; IOP Publishing, Oct. 2000, vol. 9, pp. 711-716, ISSN 0964-1726.

* cited by examiner

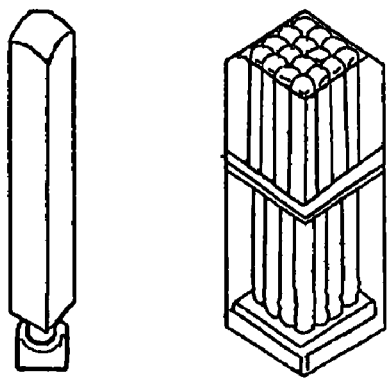
Figure 2.1    Figure 2.2
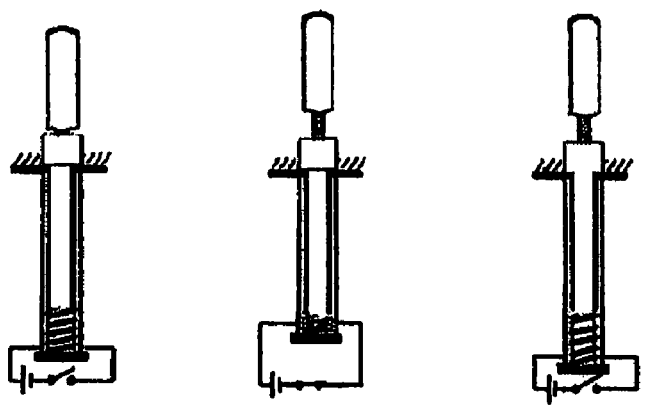
Figure 3.1    Figure 3.2    Figure 3.3
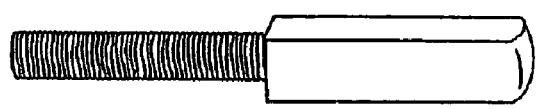
Figure 4

MECHATRONIC SYSTEM AND METHOD FOR POSITIONING BOLTS IN ORDER TO PROVIDE A FRAME WITH A RECONFIGURABLE SURFACE USING MEMORY EFFECT ACTUATORS

FIELD OF THE INVENTION

A mechatronic system for creating a rigid and reconfigurable surface to adopt complex three-dimensional profiles is disclosed. A method to control the shape of a reconfigurable surface and a method of such use are also disclosed. The system may be used as a metal or plastic sheet forming die and also as a positioning guide.

BACKGROUND OF THE INVENTION

It is known from the state of the art that in 1900 an idea of a shaping reconfigurable die appeared. However, it was not until 1923 that William and Skiner registered a patent for "Spring Forming Devices" (U.S. Pat. No. 1,465,152) wherein a two-dimension device to form bellows was developed. This device consists of two manual-adjustment bolt columns that are smoothly distributed. Afterwards in 1931, Hess patented a kit of dies with highly dense elements (U.S. Pat. No. 1,826,783) used for metal sheet stamping. In 1943, Walter takes William and Skiner's idea and expands the die up to three dimensions by adding multiple bolt columns that conform to a metal sheet, and the bolt layer being opposed to each other and with manual type adjustment (U.S. Pat. No. 2,334,520).

In 1969, Nakajima publishes in the Mechanic and Engineer Japanese Society Bulletin, a development for a vertically oriented, re-configurable automatic die, with round bolts and positionable needles, which are mounted on the head of a numerical control turning machine to create serially the shape of a die. In 1973 Wolak J., under the Boeing company sponsorship, carried out a preliminary study of a variable surface generator to be used as a stretching forming die, but the idea was abandoned due to the lack of rigidity in the adjustable bolts.

By the late 70's and early 80's, inventor David Hardt from the Massachussets Institute of Technology developed a prototype of a re-configurable die by using computer-controlled servomotors for each individual actuator. In 1980, a discrete die, quite similar to Walters's design, was also developed, except that each bolt could be automatically adjusted by a computer through individual servomotors, with bolts separated from each other (U.S. Pat. No. 4,212,188). The Massachussets Institute of Technology also developed between 1985 and 1991 a shaping re-configurable die. This design automatically adjusted the die shape row by row, making a rigid die through a grasping mechanism. Later in 1991, Finckenstein and Kleiner developed a numerical control flexible machine with square bolts for deep die-pressing. In 1997 an article was published in "AEROSPACE AMERICA" magazine from a researcher, Flinn, E. D, reporting that DARPA (Defense Advanced Research Projects Agency) sponsored a program of re-configurable tools for flexible manufacturing, which was led by Northrop Grumman Corp company, because the aerospace industry requirements demanded low volumes and an unpredictable demand that required a reduction in tooling manufacturing costs and times. That die is activated by automatically controlled motors through a computer and is used to adjust bolt height. Inventor Im, Y.-T in 1998 developed a control system for a controlled re-configurable die, but used hydraulic cylinders.

In 1998 Walczyk, D. F., and Hardt, D. E developed a die for shaping by using computer-controlled hydraulic actuators, which consisted of square bolts that allow shaping of the sheet and the use of compound materials. Walczyk et al. demonstrated that a discrete die may be actuated by means of hydraulic cylinders. In 2002 Papazian et al., together with the United States Air Force Research Laboratory and Warner Robins Air Logistics Center, already developed an activated re-configurable system with servomotors and computer controls. That die has a system that reduced even more the re-configurability time, thus increasing the productivity thereof. However all the previously mentioned patents, as well as the technological developments, have a common problem. A very large bolt size is a limitation in this kind of tooling, because it only allows material shaping having a very coarse geometry. Another restriction regarding the bolt size is the manipulating actuator, which use servomotors and/or hydraulic cylinders.

Therefore the new invention herein proposed, a reconfigurable mechatronic system for shaping materials, significantly reduces the bolt size achieving an increase in bolt density per area unit to allow a large amount of pieces to be manufactured. Additionally, servomotors and hydraulic cylinders are substituted with functional materials, such as those known as memory effect materials. These materials serve as actuators, thus considerably reducing the size of the system.

However, the system may have a number of applications: as a guide for positioning, changing the surface or for shaping the generated surface, or a sheet for any pressure form, whether by a similar tool, by heat, by water, by oil, etc. The main feature of the mechatronic system in accordance with exemplary embodiments of the present invention is that each bolt is independently actuated, and that its position may be controlled to adopt any desired surface, which gives the system unique re-configurability features, those which are as fine as the bolt smallness and amount, which would be added to the mechatronic system. The control and movement of each bolt is carried out through a transmission mechanism and an actuator with a memory effect material in the shape of a wire or a plate.

BRIEF DESCRIPTION OF THE FIGURES

FIG. 2.1 is a perspective view of a bolt;

FIG. 2.2. is a perspective view of a set of bolts for a reconfigurable die;

FIG. 3.1 is an elevational view of an original position of the bolt with a memory effect actuator;

FIG. 3.2 is an elevational view of the wire in a contraction position and the bolt ring with the memory effect actuator;

FIG. 3.3 is an elevational view of the bolt in a stand-by position waiting for another signal with the memory effect actuator;

FIG. 4 is a perspective view of an individual bolt with threads;

DETAILED DESCRIPTION OF INVENTION

Figure 1:
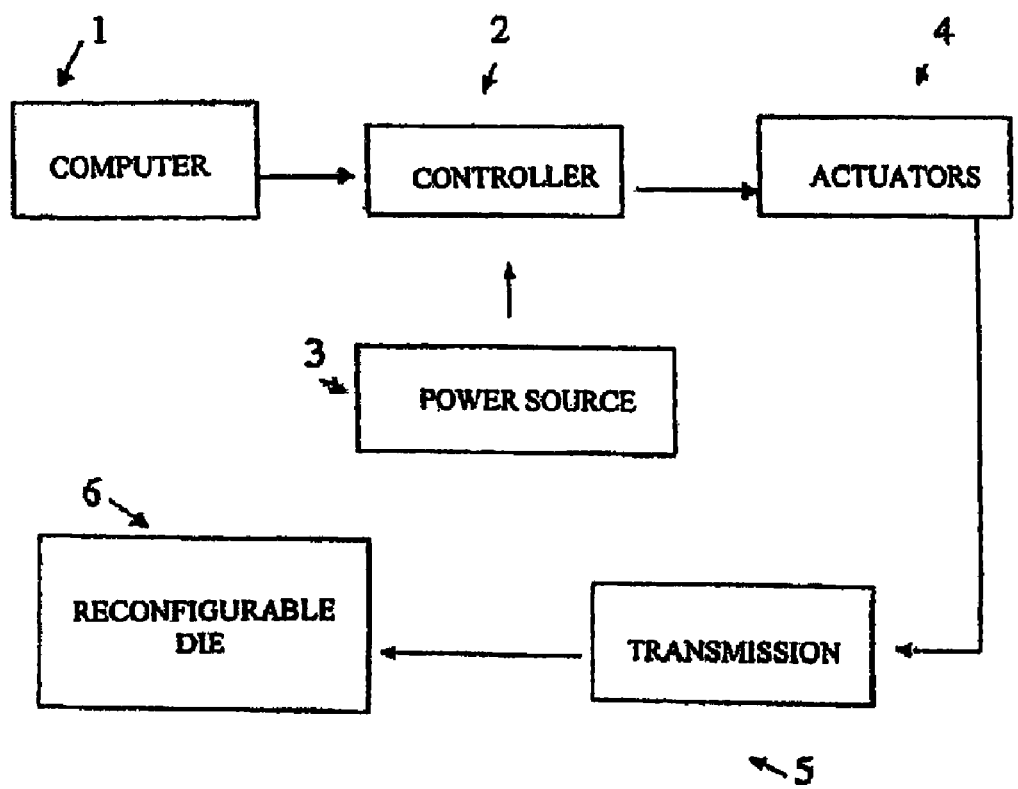
FIG. 1 is a block diagram of a mechatronic system to shape a re-configurable surface in accordance with an exemplary embodiment of the present invention.

The present invention refers to a mechatronic system and a method for positioning bolts to provide a re-configurable surface to a chassis by means of memory effect actuators. In FIG. 1, the mechatronic system comprises a data processing unit 1, an electronic control unit or controller 2, which is supplied by a power source 3, and a controller, which is connected to a set of wire actuators 4 characterized by its memory effect and its reaction to heat. The set of actuators 4 is connected to a transmission mechanism 5 having longitudinal and transverse movement that moves each bolt. The bolts together form a chassis, which is a reconfigurable die 6. These bolts are arranged matrix-like and are controlled by the longitudinal and transverse movement transmission mechanism 5.

In FIG. 1 the processing or computer unit is used to program a three-dimensional product design or drawing (desired to be manufactured as well as to execute a control program). The electronic control unit 2 is in charge of sending a signal to activate the actuators 4, and thus move the bolt or bolts upwards or downwards. In order to change the surface geometry from the die, the set of bolts in FIG. 2.2 may have a square shape, such as shown in FIG. 2.1, which may be varied in height, thus having a variable surface in three dimensions to give a shape to sheet products with the desired figure. Actuators which are commonly used in reconfigurable die systems have a minimum width of 1 inch; which occupies a considerable space. However, with this invention the actuator width is minimized, thus reducing the size by at least 75%.

This reduction is achieved by using advanced materials, such as memory effect materials. The commercial material with the best properties for the desired application is a nickel-titanium alloy (NiTi). This material can be used in a wire shape as an actuator to provide the required reconfigurability to the die. In FIG. 3.1, the basic bolt performance is shown with the memory effect material, where the extended NiTi wire may be observed without applying any current.

In FIG. 3.2 the basic bolt performance is shown when current is applied, the wire is retracted and the bolt is raised.

In FIG. 3.3 the basic bolt performance is shown with the memory effect material with the electric current removed, such that the spring extends the NiTi wire by returning to its original position.

In FIG. 4, a threaded individual bolt is shown for providing the die reconfigurability, which requires a transmission mechanism that rotates a threaded nut or cylinder so that the bolt moves upwards or downwards.

Figure 5:
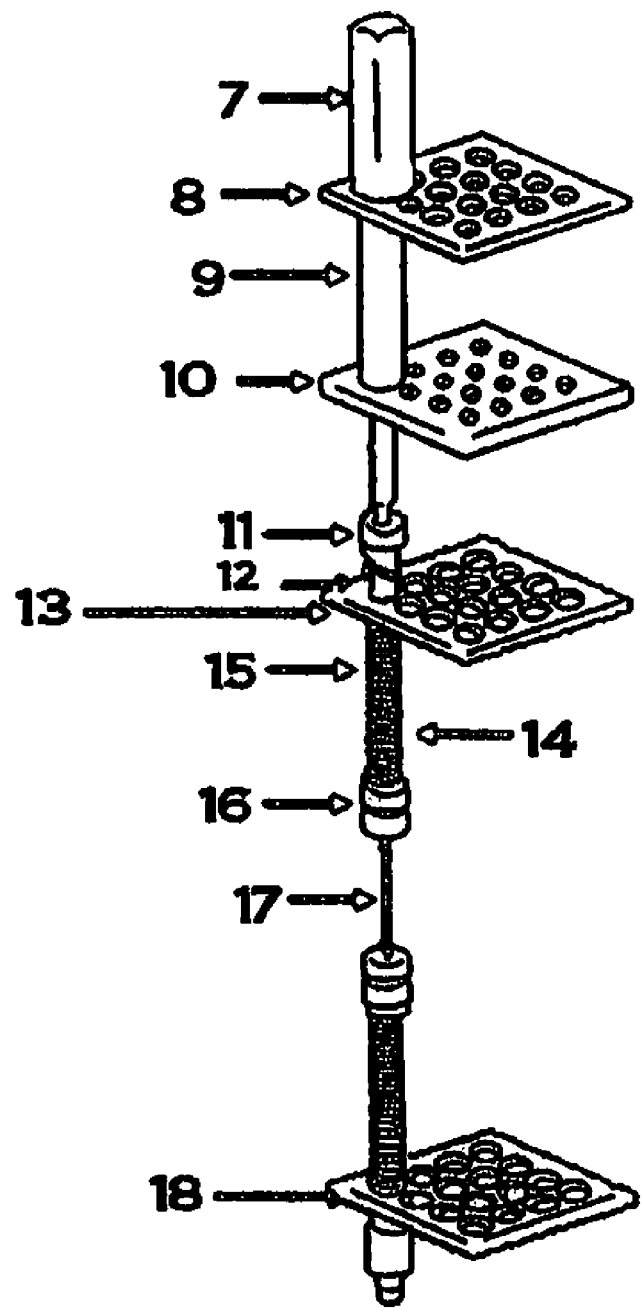
FIG. 5 is a perspective view of a transmission mechanism for longitudinal movement.

FIG. 5 shows an upward longitudinal movement transmission mechanism (the downward one is similar and is arranged in the bottom part of this mechanism). The bolt 7 is attached to a guide plate 8 and a rotating cylinder 9, which is attached to a support plate 10. The transmission mechanism comprises the crown gears 11 and 12 and transmits rotation to the cylinder 9 (a slope opposite to the crown gear causes rotation to change direction) and is attached through a plate 13. The crown gear 12 is activated by a NiTi wire with memory effect 14. The NiTi wire 14 is connected to a transmission bar 15 and has an insulator 16. The system has in its axis, a central wire 17, which provides linearity and vertical movement. To move the bolt downwards, a similar system to the one disclosed is used, though in a different direction in the transmission crown gear 18 arranged in the bottom part.

Figure 6:
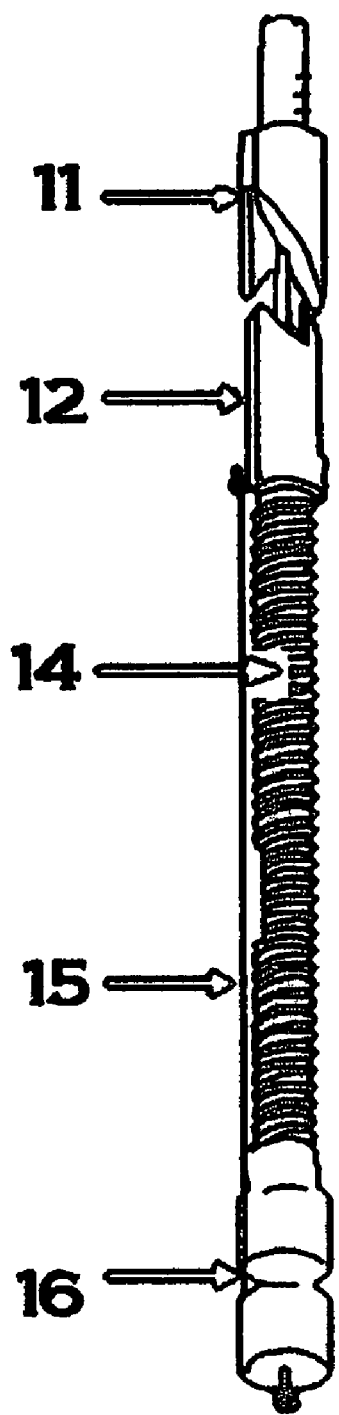
FIG. 6 is an exploded perspective view of a transmission mechanism section.

FIG. 6 shows a detail of a transmission mechanism where we can see the crown gears 11 and 12 and its coupling to transmit rotation to the cylinder moving the bolt. The crown gear 12 is activated with the memory effect material (NiTi). The wire is activated by current pulses, thus having a controlled advancement. The bolt is moved depending on the advancement that is selected by the bolt nut, such that a fine thread advances in a lower ratio than a coarse thread. By following this sequence, each bolt is separately configured. Thus, the configuration of the remaining die depends on the application, such as being used for thermoforming, for sheet forming, for hydroforming, etc. The die design and its attachment elements depend on the application.

Description of the Mechatronic System Control Method with Application to Material Shaping.

Figure 7:
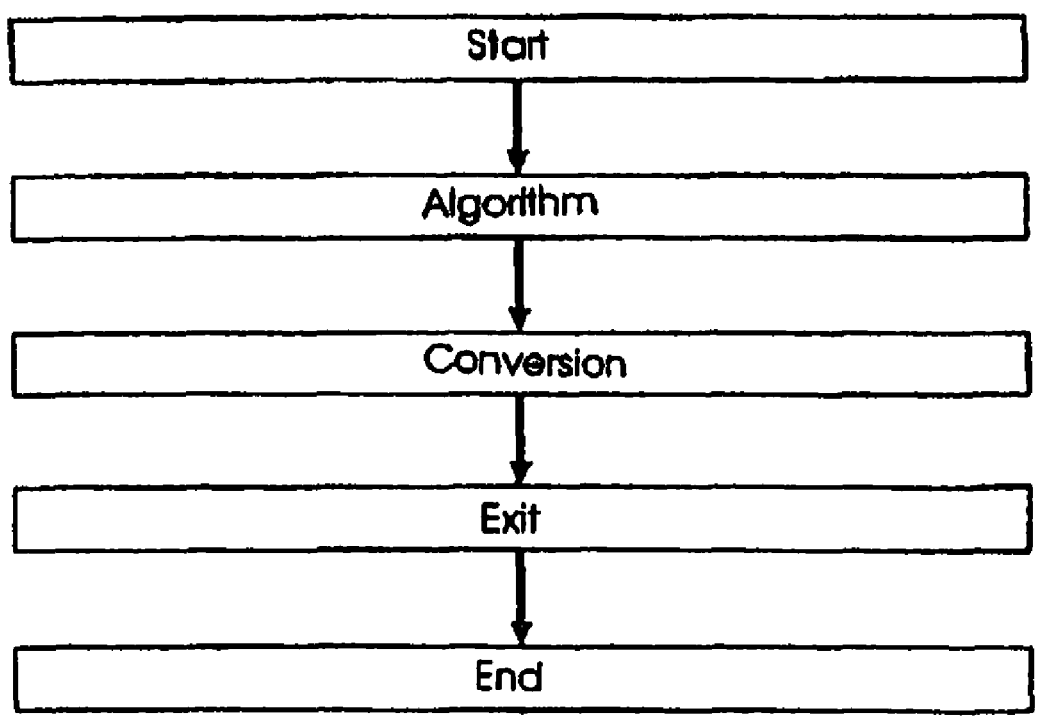
FIG. 7 is a general block diagram of a mechatronic system control method.
Figure 8:
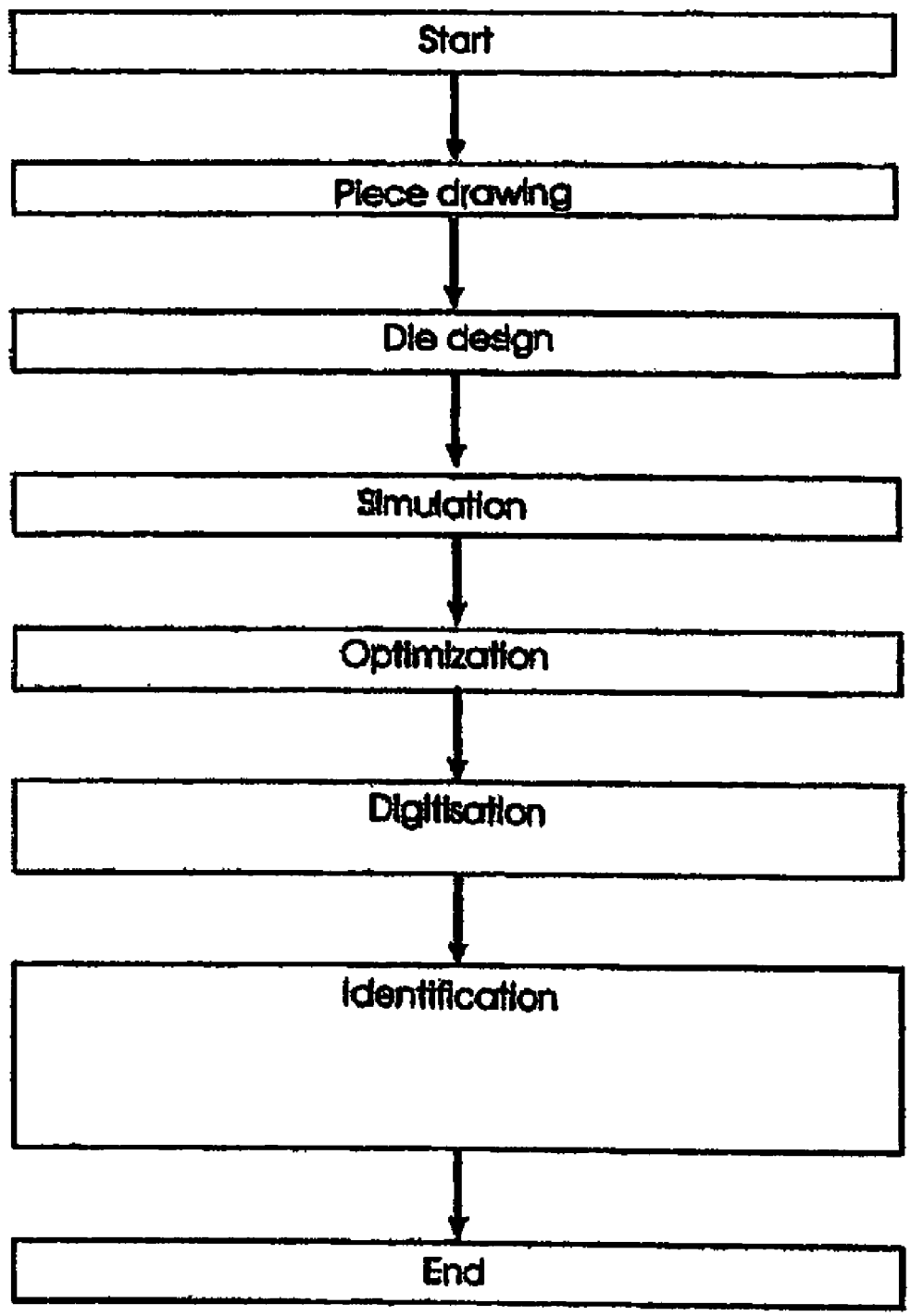
FIG. 8 is a detailed block diagram of a mechatronic system control method.

The method or control logic for die reconfigurability and each bolt movement is programmed in a computer or workstation. In FIGS. 7 and 8, the control method is described consisting of the following steps. Step I includes a positioning order algorithm for each bolt. This consists of (a) product design or drawing to be manufactured in three dimensions, (b) punching die or mold design from the product dimensions and design rules, (c) computer simulation for the shaping process and die design optimization, and (d) definition of a bolt row or column which starts the positioning movement.

Step II includes conversion of bolt distances using electric pulses. This consists of (a) dot discretization on the die surface matching with die bolts, and (b) identification of each dot through $P_{i,j}$ coordinates (X,Y,Z). Wherein i and j represent the bolt identification within the reconfigurable die and X, Y and Z, represent coordinates for each bolt including its height on the die surface. Once coordinates for each bolt and its height on the die surface are calculated, they are stored in a computer and sent to a control unit where each coordinate is transformed in electric pulses.

Step III includes an electric pulse being output to each bolt or group of bolts. This consists of controlling the distance that each bolt must go upwards or downwards to provide the desired shape through the required electric pulses. Control logic may be set out for each individual bolt. The software used allows, depending on the given pulses, each bolt to reach the right height, to store all this information and to contain a restart function wherein, upon completing the manufacturing process, the die goes back to its original position. Accordingly, each bolt returns to its original coordinates to be able to start another different shape therefrom.

The invention claimed is:

1. A mechatronic system for bolt positioning to form a reconfigurable die, comprising:
   a plurality of individually movable bolts movable between first and second positions, said second position being variable for each of said plurality of bolts to form said reconfigurable die;
   a plurality of memory effect wire actuators, each of said plurality of bolts having one of said plurality of memory effect wire actuators connected thereto;
   an electronic control unit for controlling said plurality of memory effect wire actuators; and
   a movement mechanism connected to said plurality of memory effect wire actuators for individually moving each of said plurality of bolts to said second position when said plurality of memory effect wire actuators are activated in response to said electronic control unit, said movement mechanism maintaining each of said plurality of bolts at any location between said first position and said second position when said plurality of memory effect wire actuators are deactivated.

2. The mechatronic system for bolt positioning to form a reconfigurable die in accordance with claim 1, further comprising
said electronic control unit activating said plurality of memory effect wire actuators to move all of said plurality of bolts to said first position to reset said reconfigurable die.

3. The mechatronic system for bolt positioning to form a reconfigurable die in accordance with claim 1, wherein
said movement mechanism includes a plurality of notched crown gear systems to move said plurality of bolts between first and second positions when said plurality of memory effect wire actuators are activated.

4. The mechatronic system for bolt positioning to form a reconfigurable die in accordance with claim 3, wherein
a rotation cylinder is connected between said notched crown gear system and said bolt such that rotation of said rotation cylinder moves said bolt up or down.

5. The mechatronic system for bolt positioning to form a reconfigurable die in accordance with claim 1, wherein
said plurality of memory effect wire actuators are electrically connected to said electronic control unit such that said plurality of memory effect wire actuators heat and contract when receiving power from said electronic control unit.

6. The mechatronic system for bolt positioning to form a reconfigurable die in accordance with claim 5, wherein
a spring connected to each of said plurality of memory effect wire actuators to facilitate returning each of said plurality of memory effect wire actuators to its deactivated position.

7. The mechatronic system for bolt positioning to form a reconfigurable die in accordance with claim 1, wherein
a computer connected to said electronic control unit for inputting design information for a shape to be created by said reconfigurable die.

8. The mechatronic system for bolt positioning to form a reconfigurable die in accordance with claim 1, wherein
said plurality of bolts create a three-dimensional shape on a material corresponding to said reconfigurable die when said material is applied to said plurality of bolts.

9. The mechatronic system for bolt positioning to form a reconfigurable die in accordance with claim 8, wherein
said material is liquid, solid or paste.

10. The mechatronic system for bolt positioning to form a reconfigurable die in accordance with claim 8, wherein
said material is a plate, sheet or amorphous.

11. The mechatronic system for bolt positioning to form a reconfigurable die in accordance with claim 8, wherein
said material is a metal, polymer, ceramic or composite.

12. The mechatronic system for bolt positioning to form a reconfigurable die in accordance with claim 8, wherein
a compressive force is applied to said material to form the shape defined by the reconfigurable die.

13. The mechatronic system for bolt positioning to form a reconfigurable die in accordance with claim 8, wherein
said compressive force is gravity, hydraulic, pneumatic or mechanic.

14. A mechatronic system for bolt positioning to form a reconfigurable die, comprising:
a plurality of individually movable bolts, each of said individually movable bolts being movable between first and second positions, at least one of said plurality of individually movable bolts being variable between said first and second positions;
a plurality of memory effect wire actuators, each of said plurality of bolts having one of said plurality of memory effect wire actuators connected thereto;
an electronic control unit for controlling said plurality of memory effect wire actuators; and
a movement mechanism connected to said plurality of memory effect wire actuators for individually moving each of said plurality of bolts to any location between said first position and said second position when said plurality of memory effect wire actuators are activated in response to said electronic control unit.

15. The mechatronic system for bolt positioning to form a reconfigurable die in accordance with claim 14, wherein
said first position is a fully retracted position and said second position is a fully extended position.

16. The mechatronic system for bolt positioning to form a reconfigurable die in accordance with claim 14, further comprising
said electronic control unit activating said plurality of memory effect wire actuators to move all of said plurality of bolts to said first position to reset said reconfigurable die.

17. The mechatronic system for bolt positioning to form a reconfigurable die in accordance with claim 14, wherein
said movement mechanism includes a plurality of notched crown gear systems to move said plurality of bolts between first and second positions when said plurality of memory effect wire actuators are activated.

18. The mechatronic system for bolt positioning to form a reconfigurable die in accordance with claim 14, wherein
said plurality of bolts create a three-dimensional shape on a material corresponding to said reconfigurable die when said material is applied to said plurality of bolts.

19. The mechatronic system for bolt positioning to form a reconfigurable die in accordance with claim 18, wherein
said material is liquid, solid or paste.

20. The mechatronic system for bolt positioning to form a reconfigurable die in accordance with claim 18, wherein
said material is a plate, sheet or amorphous.

* * * * *